United States Patent [19]

Shyr et al.

[11] Patent Number: 4,617,108
[45] Date of Patent: Oct. 14, 1986

[54] PROCESS FOR CRACKING WITH SILICA-ALUMINA

[75] Inventors: Yen-Shin Shyr; Marvin M. Johnson, both of Bartlesville, Okla.

[73] Assignee: Phillips Petroleum Company, Bartlesville, Okla.

[21] Appl. No.: 736,183

[22] Filed: May 20, 1985

[51] Int. Cl.$^4$ ................... C10G 11/04; C10G 47/12
[52] U.S. Cl. ................... 208/111; 208/120; 502/235
[58] Field of Search ............... 208/120, 111; 502/235

[56] References Cited

U.S. PATENT DOCUMENTS

| | | | |
|---|---|---|---|
| 2,146,718 | 2/1939 | Bond | 502/235 |
| 2,437,533 | 3/1948 | Huffman | 502/235 |
| 2,565,886 | 8/1951 | Ryland | 502/235 |
| 2,844,523 | 7/1958 | Veltman et al. | 208/120 |
| 2,886,511 | 5/1959 | Van Dyke et al. | 208/119 |
| 2,908,635 | 10/1959 | Ogorzaly | 208/120 |
| 3,210,293 | 10/1965 | O'Hara | 502/235 |
| 3,274,124 | 9/1966 | O'Hara | 502/238 |
| 3,346,509 | 10/1967 | Stewart | 502/11 |
| 3,905,916 | 9/1975 | Riley et al. | 502/235 |
| 3,912,619 | 10/1975 | Magee et al. | 208/120 |
| 4,097,365 | 6/1978 | Ward | 208/111 |
| 4,142,995 | 3/1979 | Alafandi et al. | 502/65 |
| 4,239,651 | 12/1980 | Alafandi et al. | 502/64 |
| 4,247,420 | 1/1981 | Dumoulin et al. | 502/63 |
| 4,289,653 | 9/1981 | Jaffe | 502/255 |
| 4,380,509 | 4/1983 | Sommer et al. | 502/459 |

OTHER PUBLICATIONS

"Solid Acids and Bases—Their Catalytic Properties" by Kozo Tanabe; Academic Press, New York, N.Y., pp. 5-23.

"Surface Acidity of Solid Catalysts" by H. Benesi and B. Winquist, Advances in Catalysis, vol. 27, Academic Press, 1978, pp. 97-112.

Primary Examiner—Brian E. Hearn
Assistant Examiner—O. Chaudhuri
Attorney, Agent, or Firm—K. K. Brandes

[57] ABSTRACT

A process for preparing silica-alumina compositions suitable as catalyst material comprises mixing a first aqueous solution containing an aluminum salt (preferably $KAl(SO_4)_2$) and an ammonium salt (preferably $(NH_4)_2SO_4$) with a second solution containing an alkali metal silicate (preferably $Na_2SiO_3$), wherein the concentration of the ammonium salt is chosen so as to afford coprecipitation of silica-alumina hydrogel (preferably at a pH of about 3-6). The silica-alumina hydrogel is then separated, optionally dried, and calcined. Calcined silica-alumina can be employed as cracking catalysts or as supports for hydrofining/hydrocracking catalysts.

6 Claims, No Drawings

PROCESS FOR CRACKING WITH SILICA-ALUMINA

BACKGROUND OF THE INVENTION

This invention relates to a process for preparing silica-alumina compositions. In one aspect, this invention relates to a process for preparing silica-alumina suitable as an acidic catalyst material. In yet another aspect, this invention relates to the use of silica-alumina compositions as catalysts for hydrocarbon conversion reactions.

Numerous processes for making silica-alumina compositions, suitable as catalysts or catalyst supports, are known. Some of these processes comprise the step of first forming a silica gel and then precipitating aluminum hydroxide onto the silica gel. Other processes comprise the step of mixing a silicate solution and an aluminum salt solution and then adjusting the pH of the mixture so as to coprecipitate a silica-alumina hydrogel. But there is an ever present need to find simpler and thus less expensive processes for making silica-alumina compositions than presently known processes and to prepare silica-alumina compositions that are more active as catalysts in specific reactions.

SUMMARY OF THE INVENTION

It is an object of this invention to provide a process for preparing silica-alumina compositions comprising the step of coprecipitating a silica-alumina hydrogel upon mixing a first solution comprising an aluminum salt with a second solution comprising an alkali metal silicate solution, without subsequent adjustment of the pH of the mixture. It is a further object of this invention to provide silica-alumina compositions prepared by a process comprising the step of mixing a first solution comprising an aluminum salt with a second solution comprising an alkali metal silicate so as to coprecipitate silica-alumina hydrogel and then calcining the hydrogel. It is another object of this invention to provide silica-alumina compositions having acidic sites. It is a further object of this invention to provide silica-alumina compositions suitable for use as catalysts in hydrocarbon cracking reaction. It is a still further object of this invention to impregnate silica-alumina compositions with transition metals or compounds thereof so as to provide catalysts for hydrotreating hydrocarbon oils. Other objectives and advantages will be apparent from the detailed description and the appended claims.

In accordance with this invention, a silica-alumina composition is formed by a process comprising the step of (A) mixing a first aqueous solution containing an aluminum salt and an ammonium salt of an acid having a pKa of less than 2 with a second aqueous solution containing an alkali metal silicate, wherein the amount of the ammonium salt in said first solution is such that a coprecipitate of a silica-alumina hydrogel is formed after said mixing. In a preferred embodiment, said process comprises the additional steps of (B) separating the coprecipitated silica-alumina hydrogel from the mixture of the two solutions; and (C) heating said hydrogel under such conditions as will result in the formation of an acidic silica-alumina. No adjustment of the pH of the mixture of the two solutions and no aging of the precipitated silica-alumina hydrogel is needed.

In one preferred embodiment, said first solution contains said ammonium salt in an amount that is effective to form a coprecipitate of silica-alumina hydrogel at a pH of the mixture of said two solutions ranging from about 3 to about 6. In another preferred embodiment, the aluminum salt is an aluminum sulfate containing compound, the ammonium salt is ammonium sulfate, and the alkali metal silicate is sodium silicate. Another embodiment comprises the additional step (D) of washing the coprecipitate formed in step (A) with an aqueous solution so as to remove ionic impurities from said coprecipitate. Preferably said washing step is carried out after step (B) and before step (C).

In a further embodiment, a silica-alumina composition is provided which has acidic sites. In a still further embodiment, a silica-alumina composition is provided which can be employed as a catalyst in reactions requiring an acidic catalyst. In still another embodiment, a silica-alumina composition is used as a catalyst or catalyst component for hydrocarbon conversion reactions, such as cracking of petroleum fractions.

In yet another embodiment, a silica-alumina composition prepared in accordance with the process of this invention is impregnated with a suitable transition metal compound, calcined and, optionally, sulfided. In a further embodiment, the thus impregnated, calcined and, optionally, sulfided silica-alumina composition is employed as a catalyst in the hydrofining and hydrocracking of hydrocarbon feedstocks such as crude oils or heavy residua.

DETAILED DESCRIPTION OF THE INVENTION

The term "silica-alumina hydrogel" as used herein is defined as a coagulated colloid of coprecipitated, hydrated silica-alumina containing an embedded aqueous phase.

The terms "acidic sites" and "acidity" of silica-alumina compositions as used herein refer to the presence of any sites (on the surface of the silica-alumina composition) which can chemically interact with any Bronsted or Lewis base. The acidity of silica-alumina can be determined by any of the methods described in the literature such as in "Solid Acids and Bases—Their Catalytic Properties" by Kozo Tanabe, 1970, Academic Press, New York, NY, pages 5-23, and "Surface Acidity of Solid Catalysts" by H. A. Benesi et al, Advances in Catalysis, Volume 27, 1978, Academic Press, pages 99-112, both literature citations being herein incorporated by reference.

The process for making silica-alumina in accordance with this invention comprises the step of mixing a first aqueous solution, comprising an aluminum salt plus an ammonium salt of an acid having a pKa of less than 2, with a second aqueous solution comprising an alkali metal silicate, wherein the amount of the ammonium salt in said first solution is such that a silica-alumina hydrogel is coprecipitated upon said mixing. Suitable aluminum salts are those that are substantially water-soluble such as $Al(NO_3)_3$, $Al_2(SO_4)_3$, $KAl(SO_4)_2$, $NH_4Al(SO_4)_2$, aluminum acetate and the like. Suitable ammonium salts include $NH_4Cl$, $NH_4Br$, $NH_4NO_3$, $(NH_4)_2SO_4$, $NH_4ClO_4$, ammonium trichloroacetate and the like. Suitable water-soluble alkali metal silicates include $Na_2SiO_3$, $K_2SiO_3$, $Cs_2SiO_3$, $Na_2Si_2O_5$, $K_2Si_2O_5$, $Na_2Si_2O_7$, $Na_4SiO_4$ and the like. Presently preferred process ingredients as $KAl(SO_4)_2 \cdot 16H_2O$, $(NH_4)_2SO_4$ and $Na_2SiO_3$.

Preferably, the mixing of the two solutions is carried out with agitation, e.g., by mechanical stirring or by circulating pumping action or by passing the solutions through a pipe being equipped with static mixing means. The mixing process can be carried out batchwise or continuously.

The temperature during the mixing process is not believed to be critical. The mixing can be carried out at room temperature or at an elevated temperature, e.g., up to about 70° C. The mixing time will generally be adjusted so as to obtain a precipitate that is easily settleable or filterable. Depending on the amounts and concentrations of the two solutions, the extent of agitation, the configuration of the reactor (mixing vessel), the time of mixing will generally vary from about 1 minute to about 2 hours.

The concentrations of the ingredients in the two solutions to be mixed generally range from about 0.05 to about 1 mol/l, preferably from about 0.1 to about 0.5 mol/l, of the aluminum salt (e.g., $KAl(SO_4)_2$); from about 0.05 to about 1 mol/l, preferably from about 0.1 to about 0.5 mol/l of the ammonium salt (e.g., $(NH_4)_2SO_4$); from about 0.05 to about 2 mol/l, preferably from about 0.1 to about 1 mol/l of alkali metal silicate (e.g., $Na_2SiO_3$). The mol ratio of the alkali metal silicate salt (dissolved in the second solution) to the aluminum salt (dissolved in the first solution), and thus the mol ratio of Si to Al in the formed silica-alumina, can range from about 2:1 to about 20:1, preferably from about 2:1 to about 10:1, more preferably from about 3:1 to about 6:1.

The mol ratio of the aluminum salt to the ammonium salt generally depends on the type of each such salt. When the preferred solutes of the first solution are used, the mol ratio of $KAl(SO_4)_2$ to $(NH_4)_2SO_4$ generally ranges from about 1:2 to about 5:1, preferably 1:1 to about 3:1. In general, regardless of the types of salts employed, the ratio of the ammonium salt to the aluminum salt and of the ammonium salt to the metal silicate will be such that the mixture of the two solutions prepared in accordance with this invention (so as to precipitate silica-alumina hydrogel) will have a pH ranging from about 3 to about 6, preferably from about 4 to about 5.

The silica-alumina hydrogel precipitate formed by mixing of the two solutions as outlined above can be separated from the liquid portion of the mixture by any known separation means such as filtration, centrifugation, settling followed by decantation and the like. Generally, the silica-alumina hydrogel is then washed with water or an aqueous solution containing ionic substances, e.g., by slurrying the silica-alumina hydrogel in water or said aqueous solution and refiltering it, or by passing water or said aqueous solution through a silica-alumina hydrogel filter cake, so as to remove a major portion of ionic impurities therefrom. The silica-alumina hydrogel can also be washed before any separation step by frequent slurrying with water or an aqueous solution followed by decantation or draining.

The thus washed silica-alumina hydrogel is generally calcined so as to remove embedded water therefrom and to form acidic alumina-silica, optionally after having first been dried in air. The calcination can be carried out at a temperature ranging from about 300° C. to about 800° C., preferably about 400° C. to about 650° C., for a period of time ranging from about 10 minutes to about 30 hours, preferably 1 hour to 20 hours.

The mol ratio of Si to Al in the calcined silica-alumina generally ranges from about 1:1 to about 20:1, preferably from about 2:1 to about 10:1, more preferably from about 3:1 to about 6:1. The surface area (as determined by the BET/$N_2$ method, ASTM D3037) of the calcined silica-alumina generally ranges from about 100 to about 1000 $m^2/g$, preferably from about 200 to about 500 $m^2/g$. The pore volume (as measured by mercury absorption under a pressure of 15 Kpsi) of the calcined silica-alumina generally ranges from about 0.1 to about 2 cc/g, preferably from about 0.3 to about 0.8 cc/g.

The calcined silica-alumina composition prepared in the process of this invention can be used as a catalyst "as is", particularly in reactions that require acidic catalysts, e.g., the isomerization of o-xylene to m-xylene at a temperature of about 500°–600° F. In another embodiment, silica-alumina compositions of this invention can be used, optionally mixed with a zeolite and/or a clay, as catalysts for cracking of liquid hydrocarbons such as liquid petroleum fractions, e.g., at a temperature of about 800°–1100° F., in well known cracking reactors such as FCC cracking reactors.

The calcined silica-alumina composition prepared in the process of this invention can be impregnated with suitable metals or metal compounds, e.g., with at least one compound of at least one metal belonging to Groups VB, VIB, VIIB, VIII and IB of the Periodic Table (as defined by "College Chemistry", by W. Nebergall et al; D. C. Heath and Co., 1972) preferably with compounds of molybdenum and/or nickel. In a preferred embodiment calcined silica-alumina is impregnated with a solution containing ammonium molybdate and nickel nitrate, the thus impregnated material is dried and calcined at a temperature high enough and for a time period sufficient to convert said molybdenum and nickel compounds to oxides of molybdenum and nickel (e.g., at 600°–800° F., for about 2–10 hours). Optionally, the calcined silica-alumina comprising oxides of Mo and Ni can be subjected to a sulfiding treatment with a sulfur compound such as $H_2S$ (e.g., in accordance with the procedure described in Example IV).

In one embodiment of this invention, the calcined, optionally sulfided, silica-alumina comprising oxides of Mo and Ni is employed in the hydrofining and hydrocracking of hydrocarbon containing feed streams such as liquid petroleum fractions so as to at least partially purify said feed streams and to at least partially convert the hydrocarbons in said feed streams to hydrocarbons having a lower boiling range. Typical hydrofining/hydrocracking conditions comprise a temperature ranging from about 700° to about 900° F., a hydrogen pressure ranging from about 500 to about 5000 psig, and a liquid hourly space velocity ranging from about 0.2 to about 3 volume feed oil/volume catalyst/hour in a continuous operation.

The following examples are presented to further illustrate this invention without unduly limiting the scope of the invention.

EXAMPLE I

This example illustrates a process for the preparation of a silica-alumina composition (Composition A) by a one-step precipitation process. A solution containing 18.0 grams of $(NH_4)_2SO_4$, 28.8 $KAl(SO_4)_2$—$16H_2O$ and 160 grams of water, having a pH of about 3–4, was heated to about 50° C. A second solution containing 185.5 grams of $Na_2SiO_3$ (water glass) and about 600 grams of water was slowly added to the first solution over a period of about 80 minutes. A precipitate of silica-alumina formed at a pH of about 5. The formed precipitate was filtered, washed with enough water to remove essentially all $SO_4^{-2}$ ions (as detected by the absence of a precipitate when $Ba(NO_3)_2$ was added to the filtrate), dried at about 230° F. overnight, and calcined at 500° C. for about 3 hours.

The bulk density of the calcined Catalyst A ranged from about 0.32 to 0.57 g/cc; its pore volume (measured by mercury porosimetry at 15 Kpsi) ranged from 0.41 to 0.56 cc/g; its surface area (measured by $BET/N_2$) ranged from 320 $m^2/g$ to 474 $m^2/g$. The cumulative pore volume of pores up to 300 Å in diameter was about 0.4 cc/g, and the cumulative surface area of pores up to 300 Å in diameter ranged from about 250 to about 312 $m^2/g$.

The calcined Composition A was essentially amorphous as indicated by X-ray diffraction measurements. The weight ratio of silica to alumina was about 5.5:1. Thus the molar ratio of $SiO_2$ to $Al_2O_3$ was about 10:1, and thus the Si:Al mol ratio was about 5:1. A sieve analysis gave the following particle size distribution: 11.6 weight-% of particles having a diameter of less than 45 microns; 17.2 weight-% of particles having a diameter of 45–56 microns; 49.1 weight-% of particles having a diameter of 56–120 microns, and 22.1 weight-% of particles having a diameter larger than 120 microns. Composition A contained only about 0.25 weight-% $Na_2O$.

EXAMPLE II

The silica-alumina composition of this invention prepared in accordance with the procedure of Example I was tested for its catalytic activity in the isomerization of o-xylene (to m-xylene), which requires an acidic catalyst. 5 grams of the invention catalyst composition of Example I (Composition A) and 100 mL o-xylene were added to an autoclave reactor, which was purged twice with argon and then heated to about 550° F. After about 2 hours, about 22% of o-xylene (average of four runs) was converted to m-xylene.

5 grams of a commercial silica-alumina control catalyst Composition B, GX-30 (marketed as cracking catalyst by Davison Chemical Division of W. R. Grace and Co., Baltimore, MD), calcined at about 500° C. for several hours, was employed in the o-xylene isomerization as described above. Conversion to o-xylene to m-xylene at about 550° F. was only about 12% after about 2 hours (average of two runs).

5 grams of another control catalyst (Composition C) was also used in the o-xylene isomerization. This catalyst was prepared by a conventional process comprising mixing an acidified, aqueous solution of sodium silicate (containing some silica gel) and an aqueous solution of $Al_2(SO_4)_3$, adjusting the pH to about 6 by addition of ammonia, filtering, drying and calcining the precipitate at 500° C. overnight ($BET/N_2$ surface are: 238 $m^2/g$; pore volume: 0.16 cc/g). Conversion of o-xylene to m-xylene at about 550° F. was about 16% after 2 hours when this control catalyst was employed.

These tests results indicate that the silica-alumina catalyst composition of this invention prepared by mixing an aqueous solution of an aluminum salt plus an ammonium salt with a second aqueous solution of sodium silicate was more acidic and more suited for reactions that require acidic catalysts (such as the o-xylene isomerization) than control silica-alumina catalysts prepared by conventional methods. Furthermore, the preparation of the invention catalyst composition was simpler since it required only a one-step precipitation step without any adjusting of the pH after mixing of the aluminum salt and metal silicate solutions.

EXAMPLE III

This example illustrates another process for the preparation of a silica-alumina composition (control Composition D) by another precipitation process (employing ammonium sulfate). A solution of 180 grams of $(NH_4)_2SO_4$ dissolved in 1500 grams of water was added slowly (within a period of 45–60 minutes) to a second solution containing 845 grams of sodium silicate and 600 grams of water, so as to at least partially form a precipitate of hydrated silica. To the first formed slurry was added with some agitation, within a period of about 20 minutes, an aqueous solution of about 144 grams of $Al_2(SO_4)_3$. The final slurry of silica-alumina, which had a pH of 9–10, was aged for about 10 minutes with agitation, and filtered. The filter cake was reslurried in 2500 grams $H_2O$, collected again on a filter, and dried at about 120° F. overnight. This procedure was repeated, except that the drying was carried out at 220° F.

A part of the dried silica-alumina was slurried in an aqueous 3 weight-% $(NH_4)_2SO_4$ solution and was collected on a filter. This procedure was repeated. Then the thus washed alumina-silica was slurried in an aqueous ammonia solution (pH: 9–10) and collected on a filter. This procedure was also repeated. Finally the silica-alumina composition was washed with water until the filtrate was free of $SO_4^{2-}$ ions (as indicated by the absence of a $BaSO_4$ precipitate with a $Ba^{2+}$ solution was added to the filtrate), and the finished silica-alumina composition (Composition D) was dried in a forced air oven at about 240° F. for about 2 days.

Silica-alumina Composition D was amorphous, as indicated by X-ray diffraction measurements. It contained 4.3 weight-% Al, 44.1 weight-% Si and 1.8 weight-% Na. Its surface area (measured by $BET/N_2$) was 139.1 $m^2/g$; its pore volume (up to 300 Å pore diameter) was 0.37 cc/g; and its medium pore diameter was 85 Å.

Composition D was tested for its catalytic activity in the isomerization of o-xylene, essentially in accordance with the procedure described in Example II. No appreciable amount of m-xylene was formed. Therefore, the silica-alumina control Composition D was essentially non-acidic and thus not suited as a catalyst for reactions that require acidic catalyst. Furthermore, the content of sodium impurities in control Composition D was much higher, in spite of numerous washing steps, than in invention Composition A (which was subjected to only one washing operation).

EXAMPLE IV

This example illustrates the use of invention Composition A as a component of a catalyst for hydrocracking of petroleum fractions. 20 grams of a silica-alumina material essentially identical to invention Composition A were mixed with 30 grams of a high surface area alumina and an aqueous 2.5 weight-% $HNO_3$ solution. The resulting paste was dried overnight. Then a solution, which was prepared by mixing 4.1 grams of ammonium molybdate dissolved in 30 mL $H_2O$ and 4.5 grams of an aqueous, acidified 25 weight-% NiO solution, was poured into the dried paste. The impregnated mixture was dried overnight at 240° F. and calcined at 500° C. for 5 hours. The calcined Mo, Ni-impregnated material was sulfided by passing an $H_2/H_2S$ stream through it for 10 hours at 400° F., and for 10 hours at 700° F.

A vacuum gas oil having an API$^{60}$ gravity of about 20 was hydrocracked in a stainless steel tubular reactor filled with a mixture of 25 cc of sulfided Mo, Ni-impregnated silica-alumina Composition A and 50 cc of low surface area Alundum alumina (marketed by Norton Chemical Process Products, Akron, Ohio). Process conditions were: LHSV: 1.0 cc oil/cc catalyst/hr; temperature: 700°–800° F.; H$_2$ flow: 1.5 standard cubic feet per hour; pressure: 1500 psig. The API$^{60}$ gravity of the hydrotreated product ranged from 27 to 34.

Control hydrocracking runs employing either a sulfided, Mo/Ni-impregnated silica-alumina composition prepared by conventional methods (similar to Composition C) or sulfided, Mo/Ni-impregnated alumina were carried out. Impregnation and sulfiding procedures, gas oil feed composition, and hydrocracking conditions were substantially the same as outlined above. The API$^{60}$ gravity of the hydrotreated products from these control runs ranged from 28 to 32. Thus the impregnated invention and control compositions had essentially the same hydrocracking activity.

EXAMPLE V

This example illustrates the use of a silica-alumina catalyst Composition A$^1$ prepared substantially in accordance with the procedure described for Composition A, and calcined at 500° C. for 2 hours. Composition A$^1$ (surface area: 472 m$^2$/g; pore volume: 0.5 cc/g) was employed in a micropulse, lab-size cracking reactor for the cracking of a heavy oil feed that is commonly used as feed in a commercial refinery of Phillips Petroleum Company. The feed oil was injected in aliquots of 3 microliters through a ⅛" stainless steel tube containing 15 mg of the cracking catalyst in a fixed bed so as to provide an oil:catalyst volume ratio of about 5:1. Composition A$^1$ was compared with a fresh commercial, zeolite-based cracking catalyst, GX-30 (provided by the Davison Chemical Division of W. R. Grace and Company, Baltimore, MD; surface area: 195 m$^2$/g; pore volume: 0.34 cc/g; containing about 0.6 weight-% Na, about 33 weight-% alumina and silica as the remainder). Pertinent test conditions and results are summarized in Table I.

TABLE I

| Catalyst | Composition A$^1$ (Invention) | GX-30 (Control) |
|---|---|---|
| Cracking Temperature: 950° F. | | |
| Wt % Light Gases | 22.4 | 36.1 |
| Wt % Gasoline | 46.7 | 38.5 |
| Wt % Light Cycle Oil | 14.6 | 6.4 |
| Wt % Heavy Cycle Oil | 16.3 | 19.0 |
| Cracking Temperature: 850° C. | | |
| Wt % Light Gases | 18.3 | 23.8 |
| Wt % Gasoline | 51.7 | 44.6 |
| Wt % Light Cycle Oil | 14.9 | 8.1 |
| Wt % Heavy Cycle Oil | 15.2 | 23.5 |

Data in Table I show that catalyst Composition A$^1$, prepared in accordance with this invention, produced more of the most desirable fractions, gasoline and light cycle oil, and less of light gases and undesirable heavy cycle oils than the commercial catalyst, GX-30. Therefore, the catalyst composition prepared in accordance with this invention is as effective as or more effective than commercially available cracking catalysts.

Reasonable variations and modifications are possible within the scope of the disclosure and appended claims.

We claim:

1. A process for cracking a hydrocarbon containing feed stream comprising the step of contacting said feed stream with a silica-alumina catalyst composition under such conditions as to produce hydrocarbon products having lower boiling ranges than said feed stream, wherein said silica-alumina composition is prepared by a method comprising the steps of
    (A) mixing a first aqueous solution containing an aluminum salt and an ammonium salt of an acid having a pKa of less than 2 with a second aqueous solution containing an alkali metal silicate, wherein the mol ratio of the alkali metal silicate to the aluminum salt is in the range of from about 2:1 to about 20:1 and the amount of the ammonium salt in said first solution is such that a coprecipitated silica-alumina hydrogel is formed after said mixing;
    (B) separating the coprecipitated silica-alumina hydrogel from the mixture of said two solutions;
    (C) calcining said hydrogel under such conditions as will result in the formation of an acidic silica-alumina.

2. A process in accordance with claim 1, wherein wherein the aluminum salt is potassium aluminum sulfate, the ammonium salt is ammonium sulfate, and the alkali metal silicate is sodium silicate.

3. A process in accordance with claim 1, wherein said contacting is carried out in the presence of hydrogen, and said preparation method further comprises the steps of
    (E) impregnating said calcined silica-alumina with a solution containing at least one compound of at least one transition metal selected from metals belonging to Groups VB, VIB, VIIB, VIII and IB of the Periodic Table, and
    (F) calcining said impregnated silica-alumina composition under such conditions as to convert said metal compounds to metal oxides.

4. A process in accordance with claim 1, wherein said acidic silica-alumina has a Si:Al mol ratio ranging from about 2:1 to about 10:1, a surface area ranging from about 200 m$^2$/g to about 500 m$^2$/g and a pore volume ranging from about 0.3 cc/g to about 0.8 cc/g.

5. A process in accordance with claim 2, wherein the concentration of potassium aluminum sulfate ranges from about 0.1 mol/l to about 0.5 mol/l, the concentration of ammonium sulfate ranges from about 0.1 mol/l to about 0.5 mol/l, and the concentration of sodium silicate ranges from about 0.1 mol/l to about 1 mol/l.

6. A process in accordance with claim 3, wherein said at least one transition metal is selected from the group consisting of molybdenum and nickel, and said contacting is carried out at a temperature ranging from about 700° to about 900° F., a hydrogen pressure ranging from about 500 to about 5000 psig, and a liquid hourly space velocity ranging from about 0.2 to about 3 volume feed oil/volume catalyst/hour.

\* \* \* \* \*